(12) United States Patent
Bacher et al.

(10) Patent No.: US 10,554,552 B2
(45) Date of Patent: Feb. 4, 2020

(54) MONITORING NETWORK ADDRESSES AND MANAGING DATA TRANSFER

(71) Applicant: INTERNATIONAL BUSINESS MACHINES CORPORATION, Armonk, NY (US)

(72) Inventors: Utz Bacher, Boeblingen (DE); Andreas Scheuring, Boeblingen (DE); Alexandra Winter, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 15/383,576

(22) Filed: Dec. 19, 2016

(65) Prior Publication Data

US 2018/0091425 A1  Mar. 29, 2018

(30) Foreign Application Priority Data

Sep. 28, 2016 (GB) .................................. 1616413.9

(51) Int. Cl.
*H04L 12/741* (2013.01)
*H04L 12/761* (2013.01)
*H04L 12/717* (2013.01)

(52) U.S. Cl.
CPC ............ *H04L 45/745* (2013.01); *H04L 45/16* (2013.01); *H04L 45/42* (2013.01)

(58) Field of Classification Search
None
See application file for complete search history.

(56) References Cited

U.S. PATENT DOCUMENTS

| 6,427,170 B1 | 7/2002 | Sitaraman et al. |
| 8,271,258 B2 | 9/2012 | Chan et al. |
| 8,291,050 B2 | 10/2012 | Ashok et al. |
| 8,605,582 B2 | 12/2013 | Iwai et al. |

(Continued)

FOREIGN PATENT DOCUMENTS

JP  2014525155 A  9/2014

OTHER PUBLICATIONS

Baskey, M.E., et al., "zSeries Features for Optimized Sockets-Based Messaging: HiperSockets and OSA Express," IBM Journal of Research and Development, Vo. 46, No. 4/5 Jul./Sep. 2002, pp. 475-485.

*Primary Examiner* — Adnan Baig
(74) *Attorney, Agent, or Firm* — Steven Chiu, Esq.; Heslin Rothenberg Farley & Mesiti P.C.

(57) ABSTRACT

Monitoring network addresses and managing data transfer of an electronic data processing system. A first data packet including a first source network address and a first target network address is received via a first system link of a first converged interface. The first source network address is a unique network address assigned to a subsystem of the electronic data processing system. The first converged interface checks whether the first source network address is registered in a first source table assigned to the first converged interface. If the first source network address is not registered in the first source table, a registration of the first source network address is added to the first source table and it is announced to the remaining converged interfaces of the electronic data processing system that the first source network address is registered for the first computer system.

19 Claims, 9 Drawing Sheets

(56) References Cited

U.S. PATENT DOCUMENTS

| | | | |
|---|---|---|---|
| 8,799,424 B2 | 8/2014 | Fitzpatrick et al. | |
| 9,106,529 B2 | 8/2015 | Bailey et al. | |
| 2009/0055507 A1* | 2/2009 | Oeda | G06F 9/4856 709/216 |
| 2010/0223397 A1* | 9/2010 | Elzur | H04L 41/0213 709/235 |
| 2013/0238860 A1 | 9/2013 | Archer et al. | |
| 2014/0359185 A1* | 12/2014 | Sawal | G06F 13/128 710/264 |
| 2016/0216989 A1* | 7/2016 | Bhuyan | G06F 9/45558 |

* cited by examiner

MONITORING NETWORK ADDRESSES AND MANAGING DATA TRANSFER

PRIOR FOREIGN APPLICATION

This application claims priority from United Kingdom patent application number 1616413.9, filed Sep. 28, 2016, which is hereby incorporated herein by reference in its entirety.

BACKGROUND

Aspects of the present disclosure relate to the field of data networks and more particularly to the field of monitoring network addresses and managing data transfer.

Modern computer systems are faced with the task to processing ever growing amounts of data. For satisfying this task, distributed computing systems are used in which components located on networked computers communicate and coordinate their actions by passing data packets via networks. Thus, computing resources across a network are used to accomplish tasks. For example, cloud computing is a type of network computing that provides shared computer processing resources and data to computers and other devices on demand. Requirements for implementing efficient distributed computing systems may, e.g., be availability of high-capacity networks, a widespread adoption of hardware virtualization, and autonomic and utility computing. Hence, there is a continuous need to improve monitoring network addresses and managing data transfer via networks.

SUMMARY

Various embodiments provide a method for monitoring network addresses and managing data transfer, an electronic data processing system and a computer program product as described herein. Embodiments are described in the claims. Embodiments of the present invention can be freely combined with each other if they are not mutually exclusive.

As one aspect, a method of monitoring network addresses and managing data transfer of an electronic data processing system is provided. The electronic data processing system comprises a set of computer systems in which a computer system is operatively connected to a first network and a second network. The method includes receiving, by a first converged interface of a first computer system of the set of computer systems, a first data packet, the first data packet being received from one subsystem of a plurality of subsystems of the first computer system via a first system link of the first converged interface, the first data packet comprising a first source network address and a first target network address, and wherein the first source network address is a unique network address assigned to a respective subsystem; checking whether the first source network address is registered in a first source table assigned to the first converged interface; based on the first source network address not being registered in the first source table: adding a registration of the first source network address to the first source table; announcing to remaining converged interfaces of the set of computer systems that the first source network address is registered for the first computer system reachable via the second network; and forwarding the first data packet to the first target network address.

Computer program products and systems relating to one or more aspects are also described and claimed herein.

BRIEF DESCRIPTION OF THE DRAWINGS

In the following, embodiments of the invention are explained in greater detail, by way of example only, making reference to the drawings in which.

DETAILED DESCRIPTION

Figure 1:
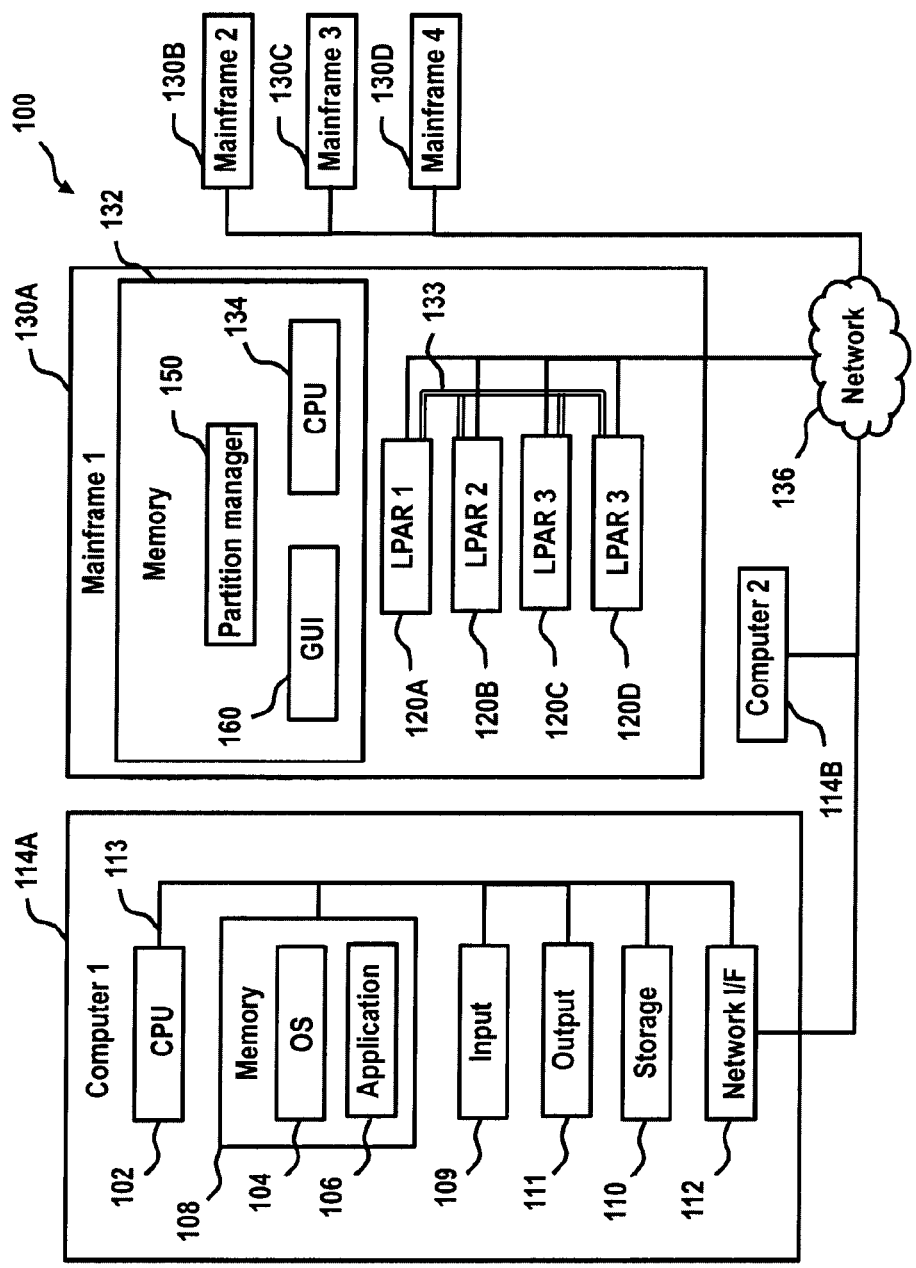
FIG. 1 depicts a schematic block diagram of example networks, in accordance with an aspect of the present invention.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may further include the following example features:

Embodiments may implement a converged interface, i.e. an interface which converges at least two network interfaces of two different networks. The converged interface may provide the functionality of a bridge that uses network addresses to process and forward data at the data link layer, i.e. layer 2 of the OSI (Open Systems Inteconnection) model, from a computer system comprising a plurality of subsystems selectively to each one of the two networks. The converged interface may further process and forward data received from each of the two networks to the computer system to which it is assigned.

It will be appreciated that an electronic data processing system described herein may be any type of computerized system comprising a plurality of processor chips, a plurality of memory buffer chips and a memory. The electronic data processing system may for example be implemented in the form of a server, an embedded computerized system or general-purpose digital computer, such as a personal computer, workstation, minicomputer, or mainframe computer. The electronic data processing system may in particular be configured as a server and/or comprising one or more servers implemented thereon, i.e. being optimized for a high speed data exchange with a large number of clients. The electronic data processing system may further provide a large processing capacity, i.e. CPU (Central Processing Unit) capacity, and/or large memory capacity. Furthermore, the software in a memory of the electronic data processing system may comprise a server software application for processing a large number of requests by clients.

The electronic data processing system may in particular be a mainframe computer. A mainframe computer may be configured to run multiple different instances of operating systems at the same time using virtual machines. Two levels of virtualization may be implemented, i.e. a first level comprising logical partitions (LPARs), for example implemented using PR/SM (Processor Resource/System Manager), and a second level comprising virtual machines, e.g. using the z/VM operating system. PR/SM is a type-1 hypervisor that allows multiple logical partitions to share physical resources such as CPUs, I/O (input/output) channels and direct access storage devices (DASD). Implementing virtual machines may allow applications to run as if they were on physically distinct computers. A single mainframe computer may replace higher-functioning hardware services available to conventional servers. One or two levels of virtualization may alternatively be provided on a common general purpose computer.

A set of computer systems as described herein may be a set of any types of computerized systems comprised by an electronic data processing system as described above. A set of computer systems may in particular be implemented in the form of a set of logical partitions implemented using a hypervisor. Subsystems as described herein may be any type of computer devices assigned with unique network addresses. A subsystem may in particular be a virtual machine.

A logical partition, commonly called an LPAR, may refer to a subset of hardware resources of an electronic data processing system, virtualized as a separate computer system or set of computer systems. A data processing system, i.e. physical machine, may be partitioned into multiple logical partitions, each hosting a separate operating system. Multiple operating systems may be implemented on LPARs, including z/OS, z/VM, z/VSE, z/TPF, AIX, Linux, and i/OS.

A virtual machine (VM) may denote an emulation of a computer system. Virtual machines may operate based on the computer architecture and functions of a real or hypothetical computer system. Their implementations may involve specialized hardware, firmware, software, or a combination thereof. Virtual machines may be classified based on the degree to which they implement functionality of targeted real machines. A system virtual machine, also referred to as full virtualization VMs, may provide a complete system platform which supports the execution of a complete operating system (OS). A process virtual machine may be configured to execute a single computer program by providing an abstracted and platform-independent program execution environment. A system virtual machine may be implemented using a type 1 or type 2 hypervisor: a type 1 hypervisor may run directly on the hardware, and a type 2 hypervisor may run on another operating system, i.e. a base OS. Each virtual machine may run any operating system supported by the underlying hardware. Users may thus run two or more different guest operating systems simultaneously, in separate private virtual machines. A virtual machine may for example be executed on a server system in a data center, but may also be deployed on a personal computing device, such as a PC, a tablet or any other mobile device.

A hypervisor, also referred to as a virtual machine monitor (VMM), may denote a piece of computer software, firmware or hardware that may create and run VMs. A computer on which a hypervisor may run one or more VMs may be defined as a host machine. Each VM may be called a guest machine. The hypervisor may present the guest operating systems with a virtual operating platform and may manage execution of the guest operating systems. Multiple instances of a variety of operating systems may share the virtualized hardware resources. More than one hypervisor may be deployed on one physical data processing system. A hypervisor may run directly on the system hardware, i.e. type 1 hypervisor, or on a host operating system, i.e. type 2 hypervisor.

A central electronic complex (CEC) may refer to a set of hardware that defines a mainframe computer, which includes the CPU(s), memory, channels, controllers and power supplies included by the mainframe. A CEC may include data storage devices as well. In the following, the terms "central electronic complex" and "mainframe computer system" may be used interchangeably.

Embodiments may have the beneficial effect that they provide a network setup, where all endpoints, i.e. subsystems, are layer 2 endpoints. One unique network address, e.g. a MAC (Media Access Control) address, may be provided per endpoint. Thus, they may provide one large L2 broadcast domain in the form of the first network. Furthermore, embodiments may provide a flat network topology, since all converged interfaces are operatively connected to both networks. Data packets may be sent from each converged interface to each other converged interface selectively either via the first or the second network. Embodiments may allow to provide a separation using network virtualization, like e.g., VLAN, VXLAN, VPN, or tunneling. Embodiments may allow for migration of subsystems together with their network addresses.

Embodiments may allow to use for each data packet to be sent via one of the converged interfaces the network path with the best possible performance. Embodiments may benefit from co-location of subsystems on the same hardware, e.g. by using a second network providing communication through a common memory of the electronic data processing system, like a HiperSockets network.

Embodiments may have the beneficial effect that a learning of new network addresses, as well as the aging of known network addresses, may be managed by the converged interface. The converged interface may maintain a source table and parse the source network addresses of data packets that are received via the system link and add them to the source table. The converged interface may announce to the second network, i.e. the second network interface and the converged interfaces operatively connected to the second network, whenever a source network address is added to the source table. No learning may be performed by the second network interface. The second network interface is rather provided with the results of the learning performed by the converged interface which announces source network addresses added to or removed from the source table. The converged interface may further announce the source network address to the first network interface.

According to embodiments, the first network interface may be set to a flooding mode, i.e. it may receive all unknown target messages as well as all multicasts and broadcasts. According to embodiments, also the mode of the converged interface may be described as a flooding mode, since all data packets received from the first or second network interface via the first and second network link, respectively, are forwarded to the system link.

For receiving data from and sending data to the two networks, the converged interface may comprise a first network link to a first network interface of the first network, and a second network link to a second interface of the second network. The first network interface may be a general, all-purpose network interface, like e.g., an Ethernet interface. Such an Ethernet interface may operatively connect the converged interface with an Ethernet connection of the electronic data processing system. The computer system of the converged interface may be implemented, e.g., in the form of a logical partition of the electronic data processing system. The second network may be a high-performance interface connecting only the set of computer systems comprised by an electronic data processing system. The electronic data processing system may, e.g., be provided by a mainframe and the set of computer systems may be implemented by a set of logical partitions of the mainframe. The second network may, for example, be provided by a HiperSockets.

HiperSockets is a high-performance virtual network implemented in firmware, that connects servers across logical partitions (LPARs) in a mainframe. It may provide high-speed connectivity within a central electronic complex (CEC), e.g. between partitions on a server with a hypervisor. It may eliminate the need for any physical cabling or external networking connection between servers running in different LPARs. The communication may be performed through the system memory of the CEC, so servers are connected to form an internal LAN (Local Area Network). HiperSockets implementation is based on the OSA-Express Queued Direct I/O (QDIO) protocol, hence HiperSockets is also called internal QDIO, or IQDIO. The microcode emulates the link control layer of an OSA-Express QDIO interface. The HiperSockets may, for example, be implemented in zSeries, System z9 and System z10 mainframes which can provide in-memory TCP/IP (Transfer Control Protocol/Internet Protocol) connections between and among LPARs running several different operating systems, including, e.g., z/OS, z/VM, and Linux on z Systems.

Although applications may perceive no functional differences, HiperSockets may require less processing overhead on either side of the connections, improving performance. Since being memory-based, HiperSockets may operate at memory speeds, reducing network latency and improving end-user performance, especially for complex applications which would otherwise require multiple network hops to fulfill requests. HiperSockets may further provide security benefits, especially on a memory key-protected mainframe, even without encryption, because no opportunity is provided to intercept an external network connection. Moreover, HiperSockets may improve reliability and availability, because due to being virtual there are no network hubs, routers, adapters, or wires to break.

The connection to an Ethernet may, e.g., be provided by an Open Systems Adapter (OSA) which is a shared Ethernet Adapter that may connect the computer systems provided by the electronic data processing system to the standard Ethernet.

Embodiments may allow to efficiently use HiperSockets for communication between servers on the same mainframe thus increasing the performance, and OSA for communication with the external Ethernet, i.e. all other targets not reachable via HiperSockets.

The first and second network may use identical network addresses to identify identical sources and/or targets which are reachable via both networks.

Embodiments may be beneficial for an enterprise data networks implementation, since one large link layer broadcast domain may be provided, where servers may be deployed and migrated anywhere without losing connectivity.

Embodiments may have the beneficial effect that each computer system may communicate with the first network directly, i.e. without requiring detours via the second network in order to reach the first network and vice versa. Thus, no extra hops are required for any of the computer systems of the set of computer systems. For example, in case of a mainframe with a plurality of LPARs, each LPAR may communicate to nodes on an external Ethernet without requiring any extra hop via a virtual switch that connects HiperSockets to the Ethernet network in a dedicated switch partition.

Embodiments may have the beneficial effect that they do not require all subsystems to support a common protocol chosen to find optimal paths and load balancing. Thereby, adding additional overhead to the communication via the first and second network may be avoided. The data transfer may be locally managed by the converged interfaces which are forwarding data packets either to the first or the second network using target tables and source tables assigned individually to each of the converged interfaces.

Embodiments may have the beneficial effect that they are practical for operating systems, like e.g., Linux with KVM, where the network interfaces and the TCP/IP stacks are not part of the same component. For example, in KVM a plurality of guest operating systems may be implemented in the hypervisor with each guest operating system having its own TCP/IP stack. Embodiments may provide a setup, where a converged network interface is provided on the data link layer rather than on the network layer.

Embodiments may have the beneficial effect that a malfunction of either one of the two networks does not affect the other one. Further, since each converged interface is reachable via both networks, the first network may be used as a substitute for the second network in case of malfunction of the second network.

Embodiments may have the beneficial effect that data packets received via the first network link are not forwarded via the second network link and vice versa. All data packets received via the first or second network link are forwarded via the system link. Furthermore, each data packet received via the system link is either forwarded via the first or the second network link, but not via both of them. Thus, a closed loop may be avoided, when forwarding data packets.

Embodiments may have the beneficial effect that all network addresses, e.g. MACs or VMACs, that belong to the converged interface may be registered with or learned by the first as well as by the second network interface. Thus, all network addresses that belong to the converged interface may be registered by the first and by the second network interface as belonging to the converged interface. Thereby, confusion ARP (Address Resolution Protocol) caches of IP stacks involved in the data transfer may be avoided. The converged interface looks like one interface everywhere. When the same VMAC is used, ARP tables may always be correct and data packets sent to a particular VMAC, which is the same for both networks, may always take the optimal path.

According to embodiments the converged interface may be implemented, e.g., in software or firmware, as an independent module, e.g. residing below other components, like OVS (Open vSwitch) or the TCP/IP stack. For example, in Linux the TCP/IP stack is a generic part of the kernel and may be used by other platforms and network devices. Thus, other software network components, like Open vSwitch, macvtap, tap devices etc., may be used in various combinations, e.g., with KVM. However, with the TCP/IP stack being a generic part of the kernel, those other software network components may not be efficiently addressable by the TCP/IP stack.

Embodiments may have the beneficial effect that the second, e.g., HiperSockets, network may be used if possible and the first, e.g. Ethernet, network if necessary.

The converged interface according to embodiments may for example be compatible with and linked to via the system link: Open vSwitch (OVS) with and without tunneling; macvtap; native Linux which may comprise a normal network interface, a VLAN subinterface, or a linuxbridge.

The converged interface according to embodiments may for example be compatible with and linked to via its first and second system link: Open Systems Adapter (OSA) and Internal Queued Direct Communication (IQD); bonded OSAs and IQD; Virtual Machine (VM) Network Interface Cards (NICs), like e.g. z/VM NICs with the converged interface running in a z/VM guest; OSA and IQD direct passthrough NICs, like e.g. QDIO Enhanced Buffer State Management (QEBSM); VM VSwitch NICs of an OSA and IQD direct passthrough (QEBSM); VM guest LAN.

The converged interface according to embodiments may further be compatible with and linked to: further converged interfaces; external switches; Linux with OSA only interfaces; z/OS converged interfaces; z/VM HiperSockets bridges; VM guest with OSA only, like e.g. QEBSM or VSwitch; VM guest with a converged interface; VM guest with z/OS converged interface, e.g. emulated IQD and OSA.

Embodiments may have the beneficial effect that they may support server migration of servers operatively connected to a first one of the converged interfaces via the system link to a second one of the converged interfaces. For example, a migration of a KVM guest, a native Linux LPAR, or a Linux zVM guest may be supported. Further, migration of other servers on the first and/or second network may be supported. Such support may be provided with or without orchestration.

Embodiments may have the beneficial effect that they support, e.g., Ipv4, Ipv6 and DHCP. Embodiments may have the beneficial effect that they may be compatible with VLANs, as well as with VXLAN.

According to embodiments, when announcing that the first source network address is registered for the first computer system reachable via the second network, a first announcement is sent to the remaining converged interfaces of the set of computer systems via the second network using the second network link and the second network interface of the first converged interface. Further, a registration of the first source network address is assigned to the respective second network interface.

Embodiments may have the beneficial effect that the converged interfaces of the computer systems connected via the second network are informed about the network addresses reachable via the second network. Thus, the converged interfaces operatively connected to the second network are enabled to setup target tables identifying target network addresses reachable via the second network. Based on those target tables each converged interface may be enabled to decide via which of the two networks a data packet is to be forwarded in order to ensure a most efficient transfer.

Embodiments may further have the beneficial effect that the second network interface assigned with the first source network address knows that the particular first source network address is reachable via the first converged interface and may forward any data packet received via the second network to the converged interface, if it comprises the first source network address as a target network address.

According to embodiments, the announcement may be transferred via an alternative connection to the converged interfaces connected to the second network. According to embodiments, a registration of the first source network address is further assigned to the first network interface. Embodiments may have the beneficial effect that the first network interface assigned with the first source network address knows that the particular first source network address is reachable via the first converged interface and may forward any data packet received via the first network to the converged interface, if it comprises the first source network address as a target network address.

According to embodiments, the first converged interface further assigns a time indicator to the registration of the first source network address. The time indicator indicates a time of registration of the first source network address. Embodiments may have the beneficial effect that the registration of the first source network address is registered. This information may be used to determine, whether the first source network address has been inactive for a predefined interval of time. Inactivity refers to no data packets being received from the first network address. If the first source network address has been inactive for the predefined interval of time, the first source network address may be removed from the first source table in order to limit the amount of data to be handled, when using the first source table. The time indicator may for example be a timestamp of the time of registration or a time of expiry calculated starting from the time of registration.

According to embodiments, if the first source network address is registered in the first source table, a time indicator of the registration of the first source network address is updated with a new time indicator indicating a time of receiving the first data packet with the first source network address. Embodiments may have the beneficial effect that they may continuously keep track of the last time of activity from the first source network address.

According to embodiments, the first converged interface checks whether the first data packet is a unicast data packet with a single first target network address. If the first data packet is a non-unicast data packet with a plurality of target network addresses, the first converged interface forwards the first data packet to the plurality of network addresses via the first network using the first network link and the first network interface of the first converged interface. Embodiments may have the beneficial effect that duplicates may be prevented, when forwarding multicast or broadcast data packets to their target addresses.

According to embodiments, each converged interface is assigned with a target table for registering target network addresses reachable from the converged interface via the second network. If the first data packet is a unicast data packet with a single first target network address, the first converged interface further checks whether the first target network address is registered in a first target table assigned to the first converged interface. If the first target network address is registered in the first target table, the first converged interface forwards the first data packet to the first target network address via the second network using the second network link and the second network interface of the first converged interface. Embodiments may have the beneficial effect that the first target table may provide an efficient basis for deciding via which of the two networks the data packet is to be forwarded. The second may provide a higher transfer performance, but less target addresses may be reachable via the second network. Thus, the second network may be preferred, if the first target network address is reachable via the second network.

According to embodiments, if the first target network address is not registered in the first target table, the first converged interface further forwards the first data packet to the first target network address via the first network using the first network link and the first network interface of the first converged interface. Embodiments may have the beneficial effect that if the first target table is not reachable via the second network, it may be reached via the first network.

According to embodiments, the first converged interface further receives a second data packet with a second source network address and a second target network address via the first network link of the first converged interface. The first converged interface forwards the second data packet to the second target network address using the first system link. Embodiments may have the beneficial effect that each data packet received via the first network link may be forwarded to the first system link. If the first network interface operatively connected with the first converged interface is assigned with registrations of all network addresses reachable via the first converged interface, the first network interface may ensure that only data packets with target network addresses actually reachable via the first converged interface may be received via the first network link of the first converged interface.

According to embodiments, the first converged interface checks whether the second source network address is registered in the first source table. If the second source network address is registered in the first source table, the first converged interface further removes the registration of the second source network address from the first source table and announces to the remaining converged interfaces of the set of computer systems that the registration of the second source network address for the first computer system is removed. Embodiments may have the beneficial effect that it may efficiently be checked whether a subsystem assigned with the second source network address as its unique network address has been migrated to another network node. If the respective subsystem has been migrated, it may be removed from the first source table and the removal may be announced to the converged interfaces operatively connected via the second network. Thus, the first source table may be kept clean and it may be avoided that data packets are sent via the second network with a target address not reachable via the second network anymore.

According to embodiments, the second network interface which is operatively connected to the first converged interface is assigned with a registration of the second source network address. The respective registration of the second source network address is removed. Embodiments may have the beneficial effect that the second network interface is informed that the second source network address is not reachable via the first converged interface anymore. According to embodiments, the first network interface which is operatively connected to the first converged interface is assigned with a registration of the second source network address. The respective registration of the second source network address is removed. Embodiments may have the beneficial effect that the first network interface is informed that the second source network address is not reachable via the first converged interface anymore.

According to embodiments, the first converged interface further receives a third data packet with a third source network address and a third target network address via the second network link of the first converged interface. The first converged interface forwards the third data packet to the third target network address using the first system link. Embodiments may have the beneficial effect that each data packet received via the second network link may be forwarded to the first system link. If the second network interface operatively connected with the first converged interface is assigned with registrations of all network addresses reachable via the first converged interface, the second network interface may ensure that only data packets with target network addresses actually reachable via the first converged interface may be received via the second network link of the first converged interface.

According to embodiments, the first converged interface further checks whether the third source network address is registered in the first source table. If the third source network address is registered in the first source table, the first converged interface removes the registration of the third source network address from the first source table and announces to the remaining converged interfaces of the set of computer systems that the registration of the third source network address for the first computer system is removed. Embodiments may have the beneficial effect that it may efficiently be checked whether a subsystem assigned with the third source network address as its unique network address has been migrated to another computer system operatively connected to the second network. If the respective subsystem has been migrated, it may be removed from the first source table and the removal may be announced to the converged interfaces operatively connected via the second network. Thus, the first source table may be kept clean and it may be avoided that data packets are sent via the second network to the first converged interface with a target address not reachable via the first converged interface anymore.

According to embodiments, the second network interface which is operatively connected to the first converged interface is assigned with a registration of the third source network address. The respective registration of the third source network address is removed. Embodiments may have the beneficial effect that the second network interface is informed that the third source network address is not reachable via the first converged interface anymore. According to embodiments, the first network interface which is operatively connected to the first converged interface is assigned with a registration of the third source network address. The respective registration of the third source network address is removed. Embodiments may have the beneficial effect that the first network interface is informed that the third source network address is not reachable via the first converged interface anymore.

According to embodiments, the first converged interface further receives a second announcement that a fourth source network address is registered for a second one of the computer systems reachable via the second network. The first converged interface adds a registration of the fourth source network address as a fourth target network address to the first target table. Embodiments may have the beneficial effect that the first converged interface may efficiently keep track of which target network addresses are reachable via the second network.

According to embodiments, the first target table comprises a registration of a fifth target network address. The first converged interface further receives a third announcement that a fifth source network address identical with the fifth target network address is removed from a third one of the computer systems. The first converged interface removes the registration of the fifth target network address from the first target table. Embodiments may have the beneficial effect that the first converged interface may efficiently keep track of which target network addresses are not reachable via the second network anymore.

According to embodiments, it is checked whether the first source table comprises a registration of a source network address with a time indicator indicating a time before a predefined time threshold. If the first source table comprises a registration of a source network address with a time indicator indicating a time before the predefined time threshold, the first converged interface further removes the registration of the respective source network address from the first source table and announces to the remaining converged interfaces of the set of computer systems that the registration of the respective source network address for the first computer system is removed. Embodiments may have the beneficial effect that an efficient method is provided for identifying and handling source addresses which have been inactive for a long time and which may be assumed to continue being inactive or to have been removed from the first computer system. The check of the time indicator may be performed by the first converged interface. According to an alternative embodiment, the check may be performed by a dedicated control program.

According to embodiments, the second network interface which is operatively connected to the first converged interface is assigned with a registration of a source network address with a time indicator indicating a time before the predefined time threshold. The registration of the source network address with the time indicator indicating a time before the predefined time threshold is removed. Embodiments may have the beneficial effect that source addresses which have been inactive for a long time and which may be assumed to continue being inactive or to have been removed from the first computer system are removed on level of the second network interface. According to embodiments, the first network interface which is operatively connected to the first converged interface is assigned with a registration of a source network address with a time indicator indicating a time before the predefined time threshold. The registration of the source network address with the time indicator indicating a time before the predefined time threshold is removed. Embodiments may have the beneficial effect that source addresses which have been inactive for a long time and which may be assumed to continue being inactive or to have been removed from the first computer system are removed on level of the first network interface.

According to embodiments, the first computer system is implemented in the form of a virtual computer system provided by a first logical partition of the electronic data processing system. The first logical partition comprises a subset of hardware resources of the electronic data processing system. Embodiments may have the beneficial effect that an efficient monitoring and management of network addresses may be applied in highly virtualized computer systems. Virtualization may efficiently amend an electronic data processing system without requiring to modify or adjust the hardware of the electronic data processing system.

According to embodiments, the virtual computer system of the first logical partition comprises a hypervisor with a first one of the subsystems. The first subsystem is provided in the form of a first virtual guest computer system. The first virtual guest computer system is assigned with a first network address and operatively connected to the first system link of the first converged interface via a virtual switch. The first network address is registered as a source network address of the logical partition in the first source table. A second virtual guest computer system is added as a second subsystem to the hypervisor. The second virtual guest computer system is assigned with a second network address and operatively connected to the first system link of the first converged interface via the virtual switch. The first data packet is sent by the second virtual guest computer system via the virtual switch to the first system link of the first converged interface in order to be forwarded to the first target address. The first source network address of the first data packet is the second network address of the second virtual guest computer system. Embodiments may have the beneficial effect that an efficient method for handling a plurality of virtual guest computer systems operatively connected to a single converged interface and each assigned with a unique network address is provided.

According to embodiments, the first and the second network are operatively independent from each other. According to embodiments, the first network is an Ethernet network and the second network is a HiperSockets network. Embodiments may have the beneficial effect that a high performance network may be efficiently implemented into the data transfer.

FIG. 1 depicts a schematic block diagram of example networks. A first network 100 connects a plurality of electronic data processing systems 114 A-B and 130A-D in which embodiments of the present invention may be implemented. In general, the example network 100 shown in FIG. 1 operatively connects four electronic data processing systems 130A-D. Electronic data processing systems 130A-D may be provided by mainframe computers. Each mainframe computer 130A-D may comprise a set of logical partitions 120A-D. Each logical partition may comprise a plurality of virtual subsystems, i.e. guest machines (not shown). These guest machines may be implemented in a server-client-architecture providing functionality to electronic data processing system 114 A-B. In the following, electronic data processing systems 130A-D may separately (and collectively) be referred to as mainframes(s) 130. The further two electronic data processing systems 114 A-B which may request functionality provided by servers 130 may separately (and collectively) be referred to as client(s) 114.

The client computer 114A and server mainframe 130A are connected via a network 100. In general, the network 100 may be a local area network (LAN) and/or a wide area network (WAN). The network 100 may for example be implemented as an Ethernet network. In a particular embodiment, the network 100 is the Internet. Mainframe 130 may comprise network servers, web servers, or any other server to communicate with client computers 114 and servers provided by the other mainframes 130B-D over network 100.

The example client computer 114A includes a central processing unit (CPU) 102 connected via a bus 113 to a memory 108, storage 110, an input device 109, an output device 111, and a network interface (I/F) device 112. The input device 109 can be any device to give input to the client computer 114A. For example, a keyboard, keypad, light pen, touch-screen, track-ball, or speech recognition unit, audio/ video player, and the like could be used. The output device 111 can be any device to give output to the user, e.g., any conventional display screen or set of speakers, along with their respective interface cards, i.e., video cards and sound cards (not shown). Although shown separately from the input device 109, the output device 111 and input device 109 could be combined. For example, a display screen with an integrated touch-screen, a display with an integrated keyboard, or a speech recognition unit combined with a text speech converter could be used.

The network interface device 112 may be any entry/exit device configured to allow network communications between the client computer 114A and the mainframe computers 130 via the network 100. For example, the network interface device 112 may be a network adapter or a network interface card (NIC).

Storage 110 may for example be a direct access storage device (DASD). Although it is shown as a single unit, it could be a combination of fixed and/or removable storage devices, such as fixed disk drives, floppy disk drives, tape drives, removable memory cards, or optical storage. The memory 108 and storage 110 could be part of one virtual address space spanning multiple primary and secondary storage devices.

The client computer 114A may generally be controlled by an operating system (OS) 104, which is shown in the memory 108. Illustrative operating systems, which may be used, include Linux and Microsoft Windows.

The memory 108 is, e.g., a random access memory sufficient to hold programming and data structures e.g. of client applications. While the memory 108 is shown as a single entity, it should be understood that the memory 108 may in fact comprise a plurality of modules, and that the memory 108 may exist at multiple levels, from high speed registers and caches to lower speed but larger DRAM (dynamic random access memory) chips.

Illustratively, the memory 108 includes an application 106 that, when executed on CPU 102, provides support for exchanging data with the various mainframes 130. The application 106 may for example be a browser that includes a web-based Graphical User Interface (GUI), which allows the user to navigate and display web-pages located on the Internet. However, more generally the application may be a thin client application configured to transfer data (e.g., HTML, XML, etc.) between the client computer 114A and the mainframe 130 via, for example, HTTP.

Mainframe computer 130A may generally contains logical partitions (LPARs) 120A-D, memory 132, CPU 134, partition manager 150, and graphical user interface (GUI) 160. An LPAR 120A-D is an allocation of resources (e.g., memory, processors, storage, etc.) within a mainframe 130A. Although four LPARs are illustrated in FIG. 1, separately (and collectively) referred to as LARP(s) 120, the number of LPARs on any mainframe 130 may be limited only by the resources available on the mainframe 130. LPARs 120 may be managed by a partition manager 150 which is referred to as a Hypervisor in some systems. A more particular embodiment of an LPAR 120 will be described below with respect to FIG. 2.

Each LPARs 120 is connected with the network 136 via a network interface (not shown). The respective network interfaces may be network adapters or a network interface card (NIC). The LPARs 120 are further connected to a second network 133. The network 133 may provide communication between LPARs 120 of the same mainframe 130 e.g. through the mainframe memory 132. The network 133 may take advantage of the shared hardware provided by mainframe 130 for high-performance data transfer at memory speeds.

Partition manager 150 may interface with a GUI 160 to configure the mainframe 130 implementing multiple LPARs 120. The memory 132 may be a random access memory sufficient to hold programming and data structures that are located on mainframe 130. The programming and data structures may be accessed and executed by the CPU 134 as needed during operation. Although it is shown as a single unit, memory 132 could be a combination of fixed and/or removable storage devices, such as fixed disk drives, floppy disk drives, tape drives, removable memory cards or optical storage. The memory 132 could be part of one virtual address space spanning multiple primary and secondary storage devices. Although it is shown as a single unit, CPU 134 could include one or more processors.

Figure 2:
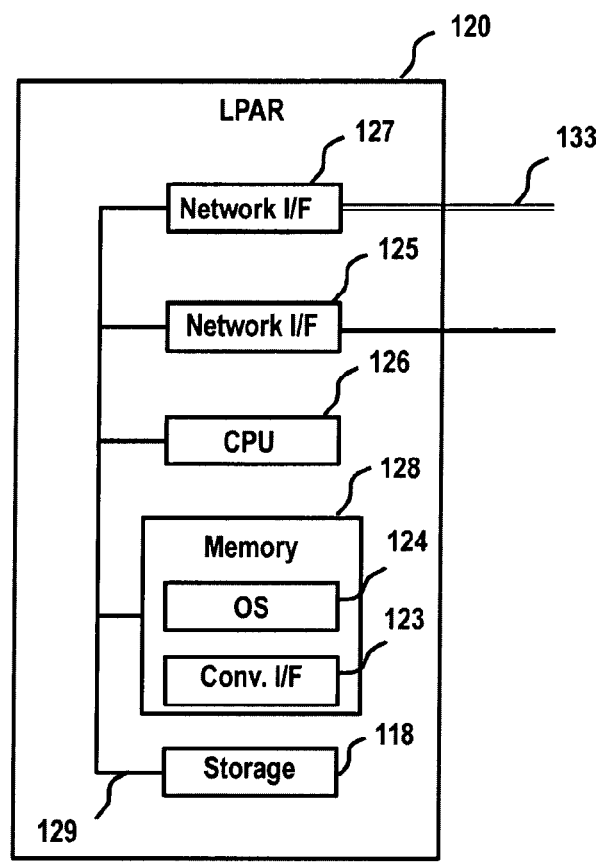
FIG. 2 depicts a schematic block diagram of an example logical partition, in accordance with an aspect of the present invention.

FIG. 2 illustrates an example logical partition 120 of FIG. 1 which may implement an embodiment of the invention. Each LPAR 120 contains, e.g., a CPU 126, a memory 128, and a storage device 118, coupled to one another by a bus 129. Although it is shown as a single unit, CPU 126 could include one or more processors. The LPAR further includes a network interface device 125 and a network interface device 127.

The memory 128 contains an operating system 124. Examples of operating systems are Linux or KVM, although other operating systems could potentially be implemented. Further, according to one embodiment of the invention, distinct LPARs on a mainframe 130A could contain different operating systems. The memory 128 may be a random access memory sufficiently large to hold the necessary programming and data structures that are located on LPAR 120, like e.g. an OS 124 and a converged interface 123. The programming and data structures may be accessed and executed by the CPU 126 as needed during operation.

Storage 118 may be a Direct Access Storage Device (DASD). Although it is shown as a single unit, it could be a combination of fixed and/or removable storage devices, such as fixed disk drives, floppy disk drives, tape drives, removable memory cards, or optical storage. The memory 128 and storage 118 could be part of one virtual address space spanning multiple primary and secondary storage devices.

The network interface device 125 is configured to allow network communications via the network 100 with the other LPARs 120 of the same mainframe 130 as well as other mainframes 130 and in particular LPARs 120 of those other mainframes 120. Via network 100 communication may also be provided with clients 114. The network interface device 127 is configured to allow network communications via the internal network 133 with the other LPARs 120 of the same mainframe 130 only. The data transfer via network interface devices 125, 127 may be managed by a virtual converged interface 123 comprised by memory 128.

Figure 3:
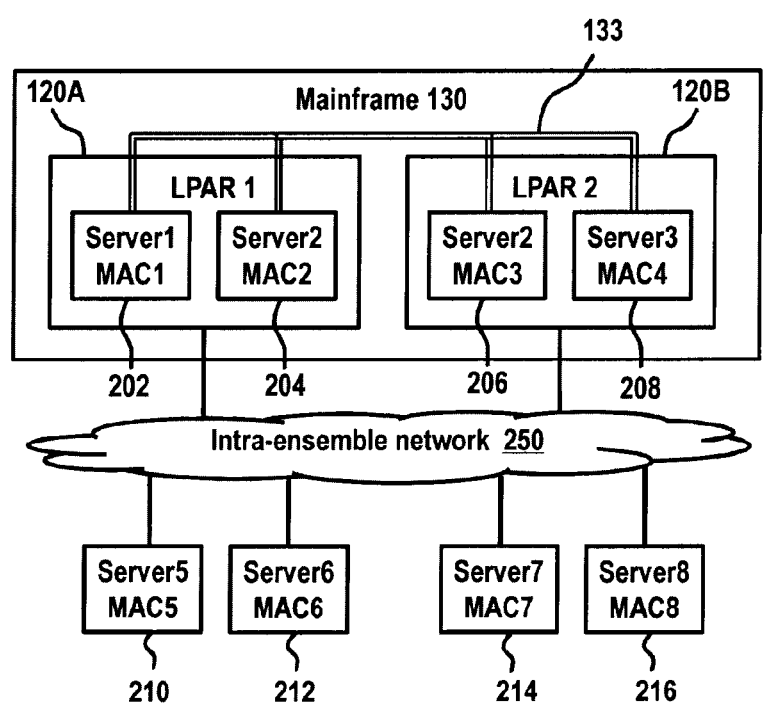
FIG. 3 depicts a schematic block diagram of a first example electronic data processing system, in accordance with an aspect of the present invention.

FIG. 3 depicts a schematic block diagram of an example mainframe 130. The mainframe 130, here also referred to as a central electronic complex (CEC), is a frame of shelves, backplanes, power mains and the like on which, e.g., two logical partitions 120A and 120B are implemented. Each logical partition 120A and 120B comprises, e.g., two servers provided by two virtual machines, i.e. server 1 202, server 2 204, server 3 206 and server 4 208. Each server comprises a unique MAC address. Each server may interconnect using the intra-ensemble data network 250 which may be part of the external network 100, using, for example, Ethernet adapters. An external network may be, for example, an Ethernet network according to the IEEE 802.3 series of standards. In addition, servers which are on the same CEC may interconnect using the internal network 133 over HiperSockets interfaces. An internal network may be, for example, a HiperSockets network. The server can select which among the two networks 133, 250, for example, is selected for transferring a data packet to its target address. For example, the internal network 133 may be selected, if a target server is present in the same CEC as the source server, and the external network may be selected when the target server is not present in the same CEC. In either case, the servers may identify themselves as using a single MAC address regardless of the physical interface to the Ethernet (external) or HiperSockets (internal) network. A target server is the destination to which a packet is directed. A target server is also known as a destination server. A source server is an originating point for a packet. An intra-ensemble data network is a network of servers that connect using Ethernet physical interfaces. The intra-ensemble data network may rely on a planar media to distribute packets amongst nodes of the intra-ensemble data network. A planar medium can consist of physical conductors that are not twisted. A planar medium can include backplanes, connectors, ribbon cables and bundled cables. In contrast, the Ethernet media, as may be used with an external network, may rely on twisted pairs of cables or planar media within a frame of the CPC. A twisted pair medium is any cabling that has at least one pair of conductors that transpose position at least twice along the length of the cable. Thus, benefits can accrue when two HiperSockets physical interfaces are present on a common planar medium such as, for example, a backplane within a central processing complex (CPC). In such a configuration, embodiments of the invention can transparently use a higher speed HiperSockets connectivity, if it is available at both the source server and the destination server (or target server), and the servers are reliant on the common planar medium.

A HiperSockets physical interface may be a bus connector that relies on device drivers on corresponding servers. The HiperSockets physical interface is identified in the hardware I/O configuration by its channel path identifier (CHPID). A CHPID is a data structure or other serial number that identifies a logical identifier of a channel. A channel is the communication to an I/O device. When the operating system or any application performs I/O to a device over a particular channel, it uses the channel's CHPID to address the physical channel port. A CHPID number is in the range from hex 00 to hex FF. The physical layer can include one or more cables according to the Cat-6 standard 802.3z standard, 802.3ab standard or similar standard. Packets on the intra-ensemble data network are TCP/IP packets. By way of the intra-ensemble data network 250, a server of the CEC, may further exchange data with servers beyond the CEC, for example, server 5 210, server 6 212, server 7 214 or Server 8 216.

Figure 4:
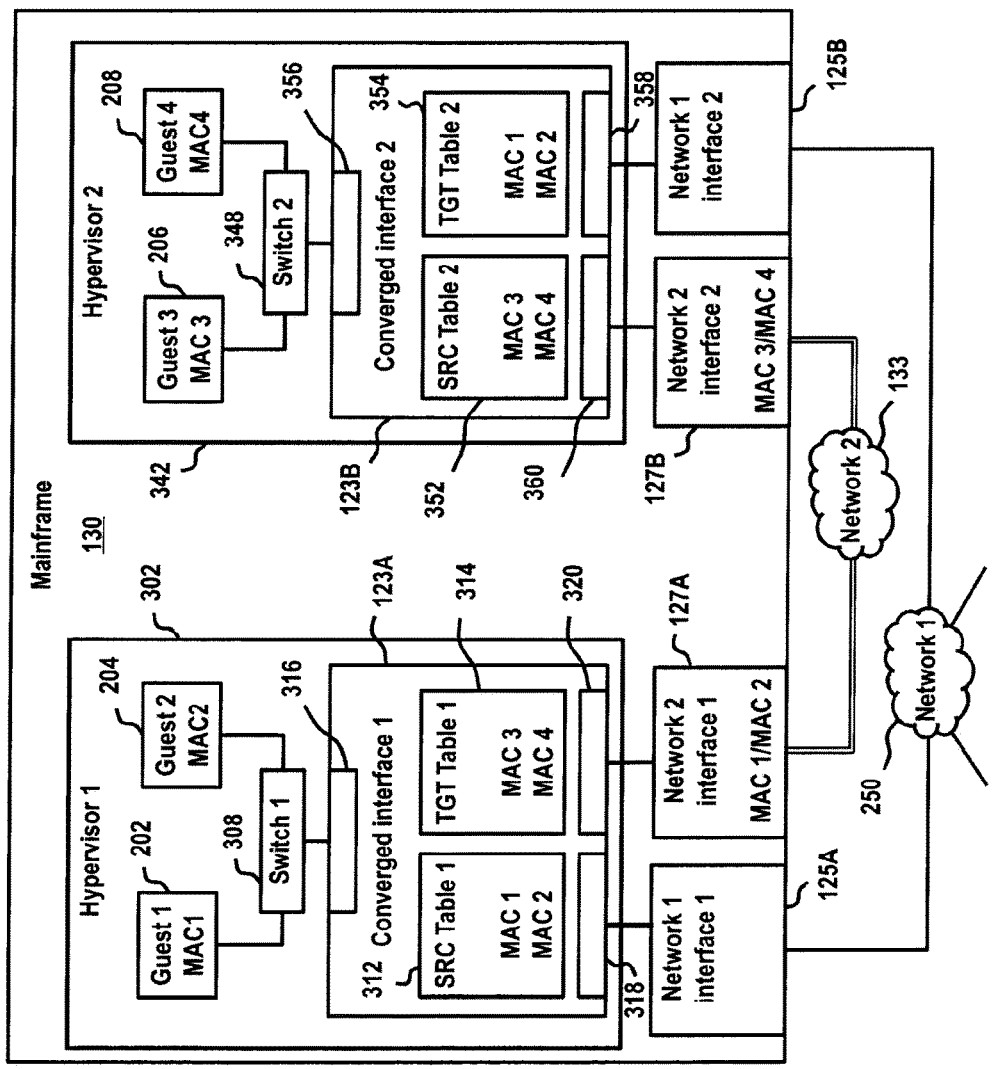
FIG. 4 depicts a schematic block diagram of a second example electronic data processing system, in accordance with an aspect of the present invention.

FIG. 4 depicts a schematic block diagram of an example of an electronic data processing system 130 in which embodiments of the present invention may be implemented. In the following the electronic data processing system 130 may be referred to as a mainframe. The example mainframe 130 of FIG. 4 comprises two LPARs. On each LPAR, implemented by one or more hypervisors running on the mainframe 130, is a virtual operating platform 302, 342. The virtual operating platforms 302, 342 are in the following referred to as first and second hypervisors. Each hypervisor 302, 342 may for example be implemented as a kernel-based virtual machine (KVM). On each hypervisor 302, 342 one or more virtual guest machines may run. In FIG. 4, the first hypervisor 302 comprises, e.g., two guest machines 202, 204, each assigned with a unique network address in the form of a MAC address, i.e. MAC1 and MAC 2. The first and second guest machines 202, 204 are connected to a system link 316 of a first converged interface 123A via a virtual switch 308. The converged interface 123A comprises a first source table (SRC) 312 and a first target (TGT) table 314. The first source table 312 comprises a list of source network addresses of devices comprised by the first hypervisor 302, i.e. MAC1 and MAC2 of guest machines 202, 204. These source network addresses are reachable via the converged interface 123A and thus via the second network 133 connecting the hypervisors 302, 342 implemented on the same mainframe 130. The first target table 312 comprises a list of source network addresses of devices reachable via the second network 133, i.e. devices comprised by other hypervisors implemented on the same mainframe 130, like e.g. MAC3 and MAC4 of guest machines 206, 208. The converged interface 123A comprises a first network link 318 which is operatively connected to the first network interface 125A of the first network 250. The converged interface 123A further comprises a second network link 320 which is operatively connected to the second network interface 127A of the second intra mainframe network 133.

The second hypervisor 342 implemented on the mainframe 130 comprises, e.g., two guest machines 206, 208, each assigned with a unique network address in the form of a MAC address, i.e. MAC 3 and MAC 4. According to embodiments e.g. the second hypervisor 342 may comprise only one guest machine (not shown). The third and fourth guest machines 206, 208 are connected to a system link 356 of a second converged interface 123B via a virtual switch 348. The converged interface 123B comprises a second source table 352 and a second target table 354. The second source table 352 comprises a list of source network addresses of devices comprised by the second hypervisor 342, i.e. MAC3 and MAC4 of guest machines 206, 208. These source network addresses are reachable via the converged interface 123B and thus via the second network 133 connecting the hypervisors 302, 342 implemented on the same mainframe 130. The second target table 354 comprises a list of source network addresses of devices reachable via the second network 133, i.e. devices comprised by other hypervisors implemented on the same mainframe 130, like e.g. MAC1 and MAC2 of guest machines 202, 204. The converged interface 123B comprises a first network link 358 which is operatively connected to the first network interface 125B of the first network 250. The converged interface 123B further comprises a second network link 360 which is operatively connected to the second network interface 127B of the second intra mainframe network 133.

Figure 5:
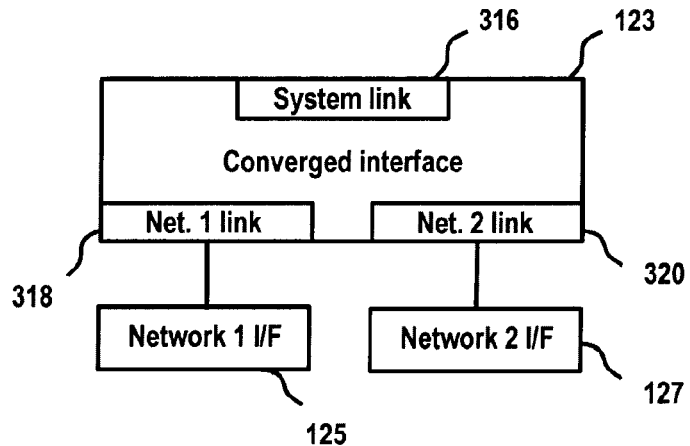
FIG. 5 depicts a detailed schematic block diagram of a first example converged interface, in accordance with an aspect of the present invention.

FIG. 5 depicts a detailed schematic block diagram of a first example converged interface 123, like e.g. converged interfaces 123A and 123B of FIG. 4. The converged interface 123 comprises a system link 316 which is operatively connectable to one or more devices implemented on the LPAR comprising the converged interface 123. Each device to be connected to the system link 316 comprises a unique network address, like e.g. a MAC address. The converged interface 123 further comprises a network link 318 and a second network link 320 which are operatively connected to a first and a second interface 125, 127, respectively. The first network interface 125 is operatively connected to a first network, the second network interface 127 is operatively connected to a second network.

Figure 6:
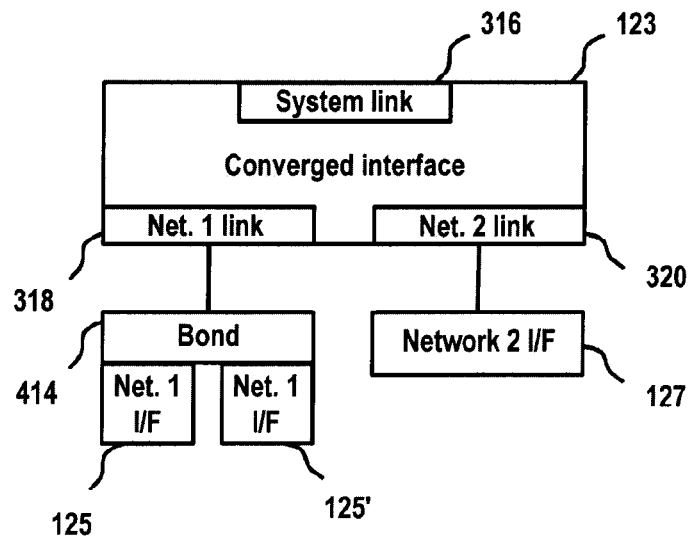
FIG. 6 depicts a detailed schematic block diagram of a second example converged interface, in accordance with an aspect of the present invention.

FIG. 6 depicts a detailed schematic block diagram of a second example converged interface 123. The second converged interface of FIG. 6 is identical to the converged interface of FIG. 5, with the only difference that the first network link 318 is operatively connected to a first interface 125 via a bond 414. In addition, a further first interface 125' is operatively connected to the bond which provides a connection to the same network as first interface 125, i.e. the first network. Implementing more than one interface for a network may have the beneficial effect that resilience may be improved. In case one of the two interfaces fails, the remaining one may help out. Furthermore, the data transfer rate to and from the first network may be increased by using two network interfaces instead of one network interface.

Figure 7:
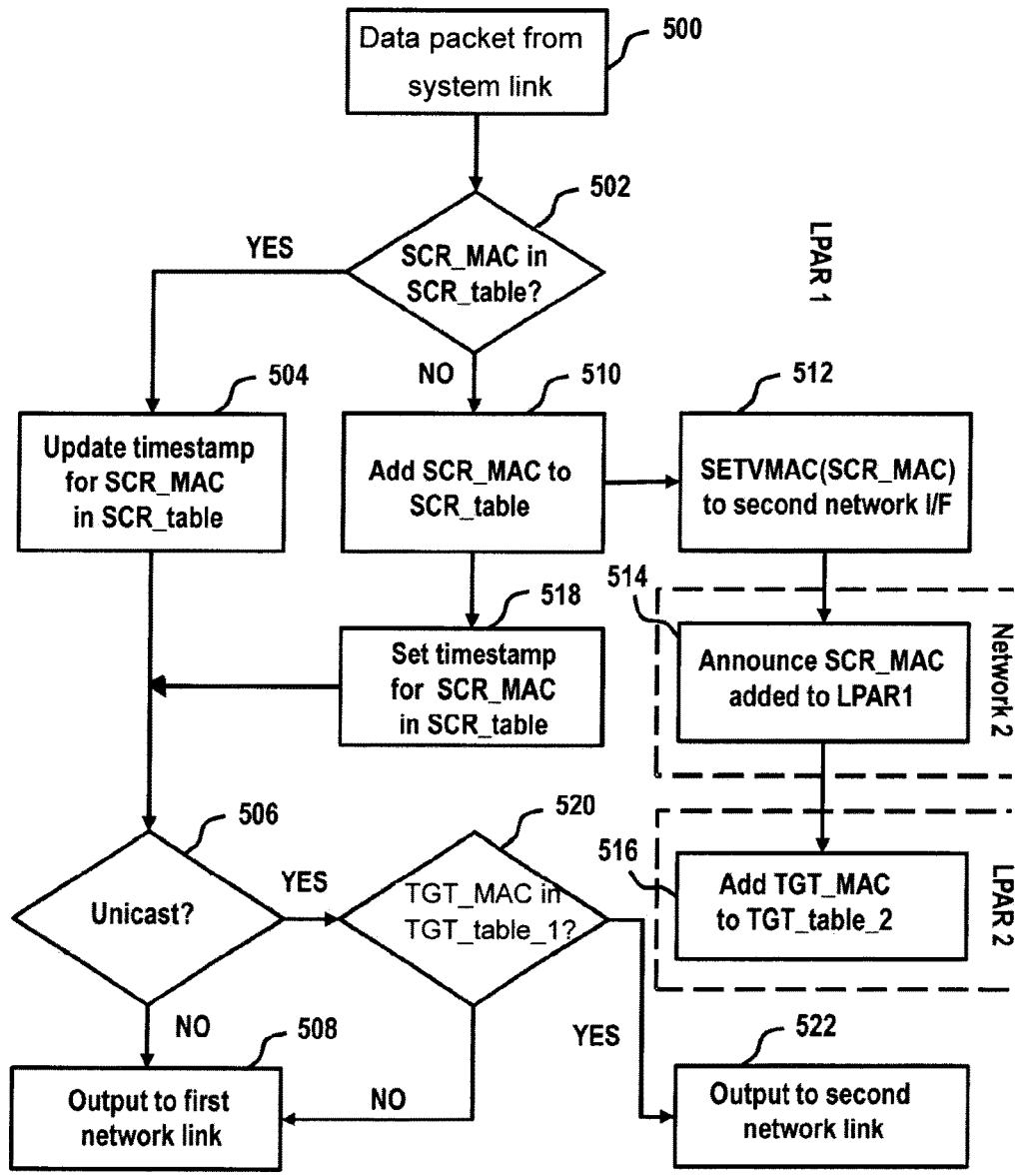
FIG. 7 depicts a schematic flow diagram illustrating a first example method for monitoring network addresses and managing data transfer, in accordance with an aspect of the present invention.

FIG. 7 depicts a first schematic flow diagram illustrating a first method for monitoring network addresses and managing data transfer according to embodiments. FIG. 7 illustrates the population of a source table (SCR_table) of a converged interface with a MAC address reachable via a converged interface thus via a second network connecting converged interfaces of the same mainframe. In block 500, a data packet is received from the system link of a converged interface. This data packet originates from a virtual machine with a unique MAC address implemented on a first LPAR which comprises the converged interface. The data packet comprises a source MAC address (SCR_MAC) and one or more target MAC addresses (TGT_MAC) identifying the source and the target of the data packet, respectively. In block 502, it is checked by the converged interface whether the source table comprises a registration of the source MAC address of the data packet.

If the source table does not comprise the source MAC address, a registration of the source MAC address is added to the source table in block 510. In block 512, the converged interface announces that a new source MAC address is reachable via the converged interface. The announcement may comprise issuing a command (SETVMAC(SCR_MAC)) via the second network link to the second network requesting the new source MAC address to be assigned to the second interface. The second interface, e.g., its firmware, may further be configured to announce in block 514 to the second network, i.e., all the remaining converged interfaces, that the new source MAC address is reachable via the converged interface of the first LPAR. In Block 516, the announced MAC address is added as a target MAC address (TGT_MAC) to a target table (TGT_table_2) of the converged interfaces of one or more additional LPARs, like a second LPAR, which receive the announcement. The firmware of the second network interfaces of the LPARs may be configured to subscribe for announcements of changes of MAC addresses assigned to any of the respective second network interfaces.

In block 510, the method may in addition continue with block 518. In block 518 a timestamp identifying the time of registration of the new source MAC address is additionally assigned to the first source table. In block 506, it is checked, whether the received data packet is a unicast data packet with a single target MAC address. If the received data packet is a unicast data packet, it is checked in block 520 whether the target MAC address is registered in a first target table (TGT_table_1) of the converged interface. If the target MAC address is registered in the first target table, the data packet is forwarded in block 522 to the second network link in order to be send to the target MAC address via the second network using the second network interface. If the target MAC address is not registered in the first target table, the method continues with block 508 after block 520 and the data packet is forwarded to the first network link in order to be sent to the target MAC address via the first network using the first network interface. If the received data packet is not a unicast data packet according to block 506, i.e. a multicast or broadcast data packet, the method continues with block 508.

If the source table comprises the source MAC address according to block 502, the method continues with block 504. In block 504, a timestamp assigned to the source MAC address is updated with a timestamp identifying the time of reception of the data packet. After block 504, the method continues with block 506.

Figure 8:
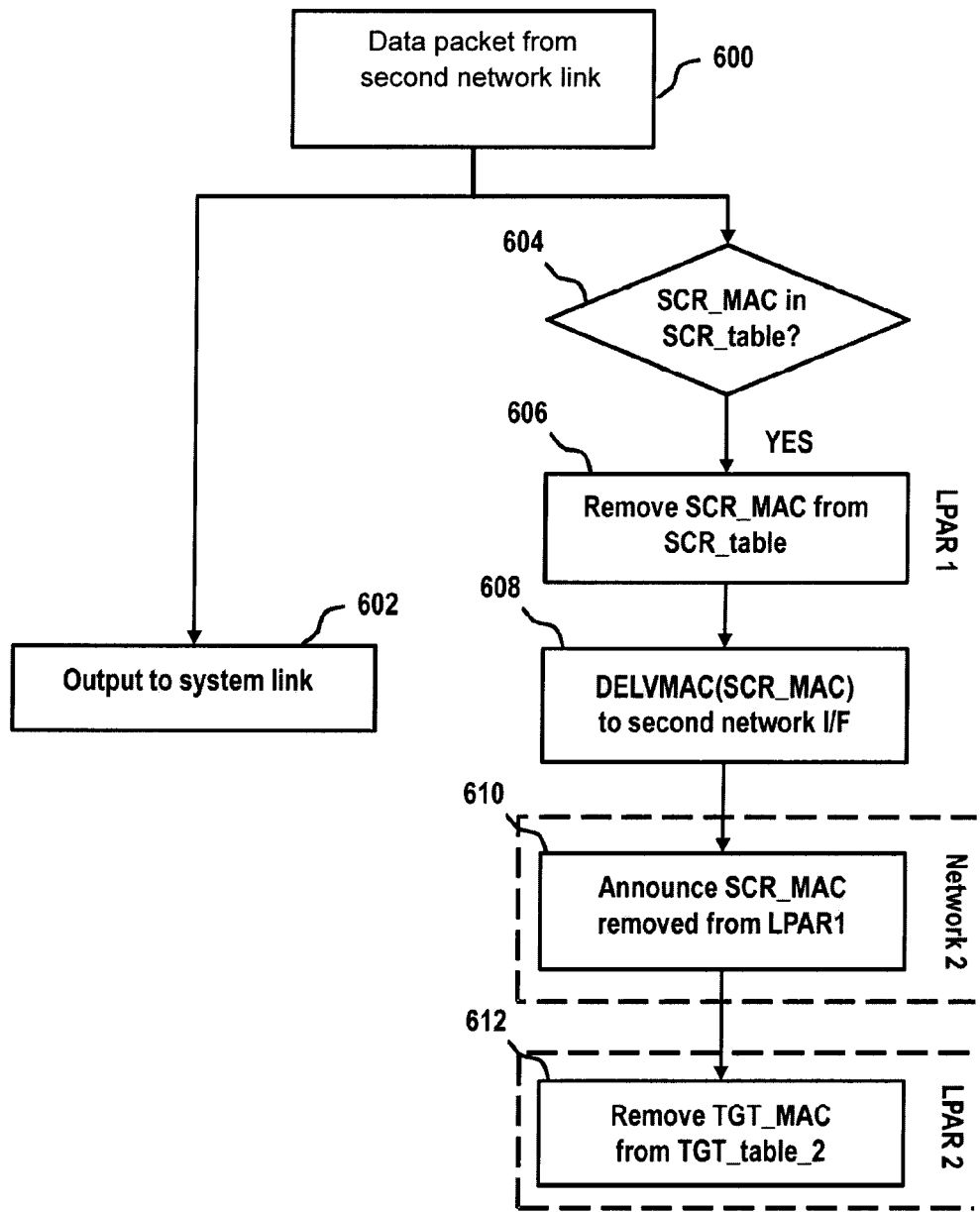
FIG. 8 depicts a schematic flow diagram illustrating a second example method for monitoring network addresses and managing data transfer, in accordance with an aspect of the present invention.

FIG. 8 depicts a first schematic flow diagram illustrating a second method for monitoring network addresses and managing data transfer according to embodiments. In block 600 a data packet is received by the converged interface from the second network link operatively connecting the converged interface to the second network link of the second network, e.g. a high performance intra mainframe network. In block 602, the data packet is forwarded to the system link of the converged interface in order to be outputted to its target MAC address e.g. of a virtual machine comprised by the first LPAR. In block 604, in addition, it is checked whether the first source table of the converged interface comprises the source MAC address of the received data packet. In case the first source table comprises the source address, the respective source MAC address is removed from the first source table in block 606. In block 608, the converged interface announces the removal of the source MAC address indicating that the respective source MAC address is not reachable via the converged interface anymore. The announcement may comprise issuing a command (DELVMAC(SCR_MAC)) via the second network link to the second network requesting that the assignment of the source MAC address to the second interface be removed as well. The second interface, e.g. its firmware, may further be configured to announce in block 610 to the second network, i.e. all the remaining converged interfaces, that the source MAC address is not reachable via the converged interface of the first LPAR anymore. In Block 612, the announced MAC address is removed from the target tables (TGT_table_2) of the converged interfaces of one or more additional LPARs, like a second LPAR, which receive the announcement.

Figure 9:
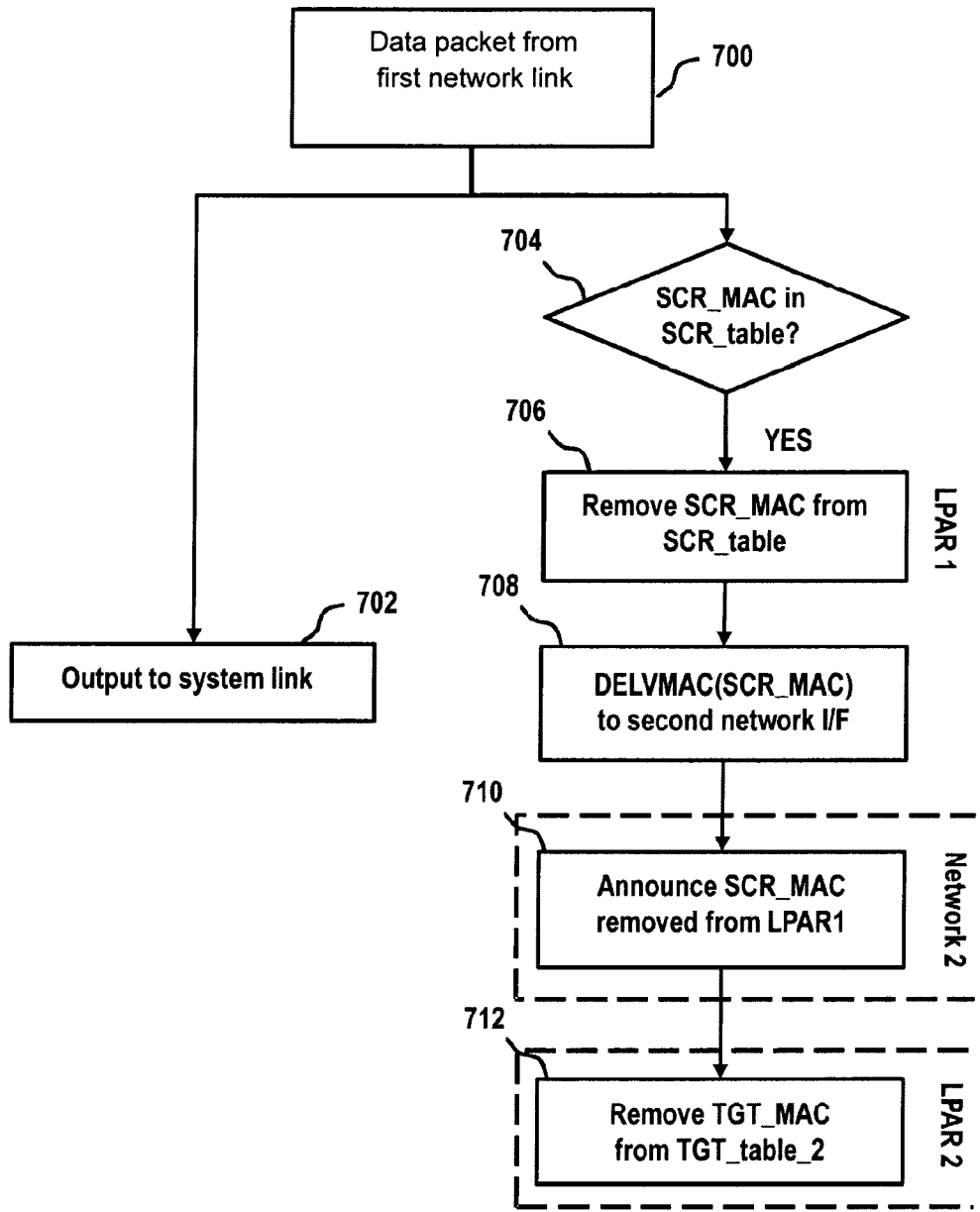
FIG. 9 depicts a schematic flow diagram illustrating a third example method for monitoring network addresses and managing data transfer, in accordance with an aspect of the present invention.

FIG. 9 depicts a first schematic flow diagram illustrating a third method for monitoring network addresses and managing data transfer according to embodiments. In block 700, a data packet is received by the converged interface from the first network link operatively connecting the converged interface to the first network link of the first network, e.g. a general network. The following blocks 702 to 712 are analogous to blocks 602 to 612 of FIG. 8.

Figure 10:
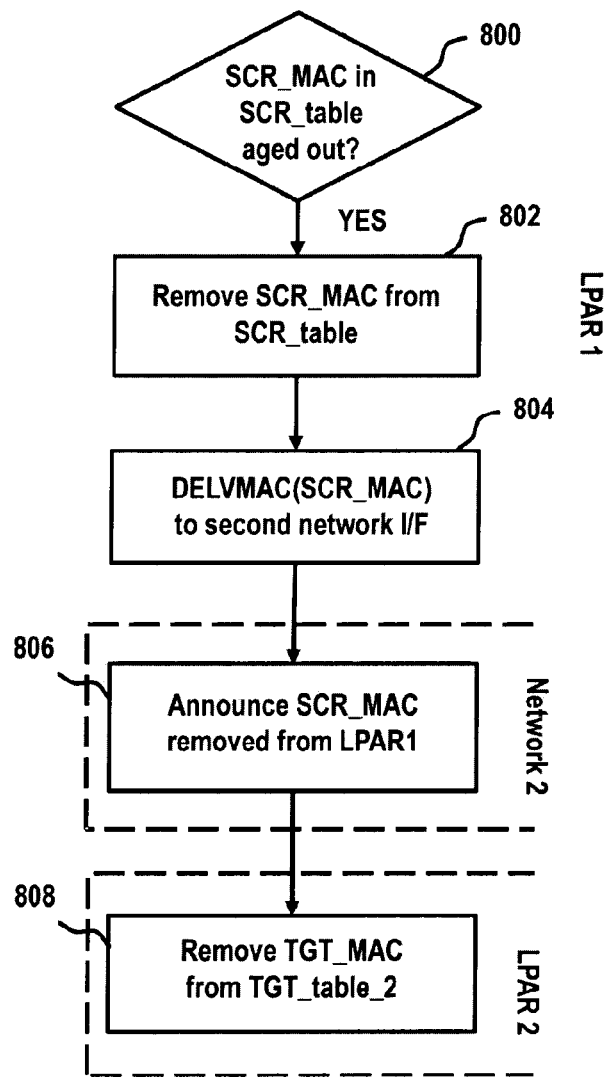
FIG. 10 depicts a schematic flow diagram illustrating a fourth example method for monitoring network addresses, in accordance with an aspect of the present invention.

FIG. 10 depicts a schematic flow diagram illustrating a fourth example method for monitoring network addresses and managing data transfer according to embodiments. In block 800, it is checked whether any of the timestamps assigned to the registrations of source MAC addresses in block 518 and/or updated in block 504 of FIG. 7 has aged out. This check may be performed at regular intervals. If one or more of the source MAC addresses comprised by the first source table are aged out, i.e. if their timestamps indicate points of time before a predefined time threshold, the respective source MAC addresses are removed from the first source table in block 802. In block 804, the converged interface announces the removal of the aged out source MAC addresses indicating that the respective source MAC addresses are not reachable via the converged interface anymore. The announcement may comprise issuing a command via the second network link to the second network requesting that the assignments of the aged out source MAC addresses to the second interface be removed as well. The second interface, e.g. its firmware, may further be configured to announce in block 806 to the second network, i.e. all the remaining converged interfaces, that the aged out source MAC addresses are not reachable via the converged interface of the first LPAR anymore. In block 808, the announced MAC addresses are removed from the target tables of the converged interfaces of one or more additional LPARs, like a second LPAR, which receive the announcement.

As described herein, one aspect of the invention relates to a method for monitoring network addresses and managing data transfer of an electronic data processing system. The electronic data processing system comprises a set of computer systems. Each computer system is operatively connected to a first and a second network. The second network is limited to connecting the set of computer systems. The operative connection of each computer system comprises an individual converged interface which comprises a system link to the computer system, a first network link to a first network interface of the first network, and a second network link to a second interface of the second network. Each converged interface is assigned with a source table for registering source network addresses which are comprised by the computer system of the respective converged interface. At least a first one of the computer systems comprises a plurality of subsystems. Each subsystem is assigned with a unique network address.

A first converged interface of the first computer system receives a first data packet from one of the subsystems via a first system link of the first converged interface. The first data packet comprises a first source network address and a first target network address. The first source network address is the unique network address assigned to the respective subsystem.

The first converged interface checks whether the first source network address is registered in a first source table assigned to the first converged interface. If the first source network address is not registered in the first source table, a registration of the first source network address is added to the first source table. The first converged interface announces to the remaining converged interfaces of the set of computer systems that the first source network address is registered for the first computer system reachable via the second network. The first data packet is forwarded by the first converged interface to the first target network address.

A further aspect of the invention relates to an electronic data processing system. The electronic data processing system comprises a set of computer systems. Each computer system is operatively connected to a first and a second network. The second network is limited to connecting the set of computer systems. The operative connection of each computer system comprises an individual converged interface which comprises a system link to the computer system, a first network link to a first network interface of the first network, and a second network link to a second interface of the second network. Each converged interface is assigned with a source table for registering source network addresses which are comprised by the computer system of the respective converged interface. At least a first one of the computer systems comprises a plurality of subsystems. Each subsystem is assigned with a unique network address.

The electronic data processing system is configured for performing a method for monitoring network addresses and managing data transfer of the electronic data processing system. A first converged interface of the first computer system receives a first data packet from one of the subsystems via a first system link of the first converged interface. The first data packet comprises a first source network address and a first target network address. The first source network address is the unique network address assigned to the respective subsystem.

The first converged interface checks whether the first source network address is registered in a first source table assigned to the first converged interface. If the first source network address is not registered in the first source table, a registration of the first source network address is added to the first source table. The first converged interface announces to the remaining converged interfaces of the set of computer systems that the first source network address is registered for the first computer system reachable via the second network. The first data packet is forwarded by the first converged interface to the first target network address.

A further aspect of the invention relates to a computer program product comprising a computer-readable storage medium having computer-readable program code embodied therewith for monitoring network addresses and managing data transfer of an electronic data processing system. The electronic data processing system comprises a set of computer systems. Each computer system is operatively connected to a first and a second network. The second network is limited to connecting the set of computer systems. The operative connection of each computer system comprises an individual converged interface which comprises a system link to the computer system, a first network link to a first network interface of the first network, and a second network link to a second interface of the second network. Each converged interface is assigned with a source table for registering source network addresses which are comprised by the computer system of the respective converged interface. At least a first one of the computer systems comprises a plurality of subsystems. Each subsystem is assigned with a unique network address.

The computer-readable program code is configured to implement a method for monitoring network addresses and managing data transfer of the electronic data processing system. A first converged interface of the first computer system receives a first data packet from one of the subsystems via a first system link of the first converged interface. The first data packet comprises a first source network address and a first target network address. The first source network address is the unique network address assigned to the respective subsystem.

The first converged interface checks whether the first source network address is registered in a first source table assigned to the first converged interface. If the first source network address is not registered in the first source table, a registration of the first source network address is added to the first source table. The first converged interface announces to the remaining converged interfaces of the set of computer systems that the first source network address is registered for the first computer system reachable via the second network. The first data packet is forwarded by the first converged interface to the first target network address.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of monitoring network addresses and managing data transfer of an electronic data processing system, the electronic data processing system comprising a set of computer systems in which a computer system is operatively connected to a first network and a second network, and wherein the method comprises:

receiving, by a first converged interface of a first computer system of the set of computer systems, a first data packet, the first data packet being received from one subsystem of a plurality of subsystems of the first computer system via a first system link of the first converged interface, the first data packet comprising a first source network address and a first target network address, and wherein the first source network address is a unique network address assigned to a respective subsystem;

checking whether the first source network address is registered in a first source table assigned to the first converged interface;

based on the first source network address not being registered in the first source table:
adding a registration of the first source network address to the first source table;
announcing to remaining converged interfaces of the set of computer systems that the first source network address is registered for the first computer system reachable via the second network; and
forwarding the first data packet to the first target network address;

wherein the first converged interface comprises a first network link to a first network interface of the first network and a second network link to a second network interface of the second network, and wherein the announcing comprises:
sending a first announcement to the remaining converged interfaces of the set of computer systems via the second network using the second network link and the second network interface of the first converged interface; and
assigning a registration of the first source network address to a respective second network interface.

2. The method of claim 1, further comprising assigning by the first converged interface a time indicator to the registration of the first source network address indicating a time of registration of the first source network address.

3. The method of claim 1, further comprising updating, based on the first source network address being registered in the first source table, a time indicator of the registration of the first source network address with a new time indicator indicating a time of receiving the first data packet with the first source network address.

4. The method of claim 1, wherein the first converged interface comprises a first network link to a first network interface of the first network and a second network link to a second network interface of the second network, and wherein the forwarding of the first data packet comprises:
checking by the first converged interface whether the first data packet is a unicast data packet with a single first target network address; and
based on the first data packet being a non-unicast data packet with a plurality of target network addresses, forwarding by the first converged interface the first data packet to the plurality of target network addresses via the first network using the first network link and the first network interface.

5. The method of claim 4, wherein the forwarding of the first data packet further comprises:
based on the first data packet being a unicast data packet with a single first target network address:
checking by the first converged interface whether the first target network address is registered in a first target table assigned to the first converged interface; and
based on the first target network address being registered in the first target table, the forwarding of the first data packet further comprises forwarding by the first converged interface the first data packet to the first target network address via the second network using the second network link and the second network interface.

6. The method of claim 5, further comprising based on the first target network address not being registered in the first target table, the forwarding of the first data packet further comprises forwarding by the first converged interface the first data packet to the first target network address via the first network using the first network link and the first network interface.

7. The method of claim 1, further comprising:
receiving, by the first converged interface, a second data packet with a second source network address and a second target network address via a first network link of the first converged interface; and
forwarding the second data packet to the second target network address using the first system link.

8. The method of claim 7, further comprising:
checking, by the first converged interface, whether the second source network address is registered in the first source table; and
based on the second source network address being registered in the first source table:
removing a registration of the second source network address from the first source table; and
announcing to remaining converged interfaces of the set of computer systems that the registration of the second source network address for the first computer system is removed.

9. The method of claim 1, wherein the first converged interface comprises a first network link to a first network interface of the first network and a second network link to a second network interface of the second network and wherein the method further comprises:
receiving, by the first converged interface, a third data packet with a third source network address and a third target network address via the second network link of the first converged interface; and
forwarding the third data packet to the third target network address using the first system link.

10. The method of claim 9, further comprising:
checking, by the first converged interface, whether the third source network address is registered in the first source table; and
based on the third source network address being registered in the first source table:
removing a registration of the third source network address from the first source table; and
announcing to remaining converged interfaces of the set of computer systems that the registration of the third source network address for the first computer system is removed.

11. The method of claim 1, further comprising:
receiving, by the first converged interface, a second announcement that a fourth source network address is registered for a second one of the computer systems reachable via the second network; and adding a registration of the fourth source network address as a fourth target network address to a first target table assigned to the first converged interface.

12. The method of claim 1, further comprising:

checking whether the first source table comprises a registration of a source network address with a time indicator indicating a time before a predefined time threshold; and based on the first source table comprising a registration of a source network address with a time indicator indicating a time before the predefined time threshold:

removing the registration of the source network address from the first source table; and announcing to remaining converged interfaces of the set of computer systems that the registration of the source network address for the first computer system is removed.

13. An electronic data processing system comprising a set of computer systems, in which a computer system is operatively connected to a first network and a second network, and wherein the electronic data processing system is configured to perform a method, said method comprising:

receiving, by a first converged interface of a first computer system of the set of computer systems, a first data packet, the first data packet being received from one subsystem of a plurality of subsystems of the first computer system via a first system link of the first converged interface, the first data packet comprising a first source network address and a first target network address, and wherein the first source network address is a unique network address assigned to a respective subsystem;

checking whether the first source network address is registered in a first source table assigned to the first converged interface;

based on the first source network address not being registered in the first source table:

adding a registration of the first source network address to the first source table;

announcing to remaining converged interfaces of the set of computer systems that the first source network address is registered for the first computer system reachable via the second network; and forwarding the first data packet to the first target network address;

wherein the first converged interface comprises a first network link to a first network interface of the first network and a second network link to a second network interface of the second network, and wherein the announcing comprises:

sending a first announcement to the remaining converged interfaces of the set of computer systems via the second network using the second network link and the second network interface of the first converged interface; and assigning a registration of the first source network address to a respective second network interface.

14. The electronic data processing of claim 13, wherein the first converged interface comprises a first network link to a first network interface of the first network and a second network link to a second network interface of the second network, and wherein the forwarding of the first data packet comprises:

checking by the first converged interface whether the first data packet is a unicast data packet with a single first target network address; and based on the first data packet being a non-unicast data packet with a plurality of target network addresses, forwarding by the first converged interface the first data packet to the plurality of target network addresses via the first network using the first network link and the first network interface.

15. The electronic data processing system of claim 14, wherein the forwarding of the first data packet further comprises:

based on the first data packet being a unicast data packet with a single first target network address:

checking by the first converged interface whether the first target network address is registered in a first target table assigned to the first converged interface; and based on the first target network address being registered in the first target table, the forwarding of the first data packet further comprises forwarding by the first converged interface the first data packet to the first target network address via the second network using the second network link and the second network interface.

16. The electronic data processing of claim 13, wherein the method further comprises:

checking whether the first source table comprises a registration of a source network address with a time indicator indicating a time before a predefined time threshold; and based on the first source table comprising a registration of a source network address with a time indicator indicating a time before the predefined time threshold:

removing the registration of the source network address from the first source table; and announcing to remaining converged interfaces of the set of computer systems that the registration of the source network address for the first computer system is removed.

17. A computer program product for monitoring network addresses and managing data transfer of an electronic data processing system, the electronic data processing system comprising a set of computer systems in which a computer system is operatively connected to a first network and a second network, and wherein the computer program product comprises:

a computer readable storage medium readable by a processing circuit and storing instructions for execution by the processing circuit for performing a method comprising:

receiving, by a first converged interface of a first computer system of the set of computer systems, a first data packet, the first data packet being received from one subsystem of a plurality of subsystems of the first computer system via a first system link of the first converged interface, the first data packet comprising a first source network address and a first target network address, and wherein the first source network address is a unique network address assigned to a respective subsystem;

checking whether the first source network address is registered in a first source table assigned to the first converged interface;

based on the first source network address not being registered in the first source table:

adding a registration of the first source network address to the first source table;

announcing to remaining converged interfaces of the set of computer systems that the first source network address is registered for the first computer system reachable via the second network; and forwarding the first data packet to the first target network address;

wherein the first converged interface comprises a first network link to a first network interface of the first network and a second network link to a second network interface of the second network, and wherein the announcing comprises:

sending a first announcement to the remaining converged interfaces of the set of computer systems via the second network using the second network link and the second network interface of the first converged interface; and assigning a registration of the first source network address to a respective second network interface.

18. The computer program product of claim 17, wherein the first converged interface comprises a first network link to a first network interface of the first network and a second network link to a second network interface of the second network, and wherein the forwarding of the first data packet comprises:

checking by the first converged interface whether the first data packet is a unicast data packet with a single first target network address; and based on the first data packet being a non-unicast data packet with a plurality of target network addresses, forwarding by the first converged interface the first data packet to the plurality of target network addresses via the first network using the first network link and the first network interface.

19. The computer program product of claim 18, wherein the forwarding of the first data packet further comprises:

based on the first data packet being a unicast data packet with a single first target network address:

checking by the first converged interface whether the first target network address is registered in a first target table assigned to the first converged interface; and based on the first target network address being registered in the first target table, the forwarding of the first data packet further comprises forwarding by the first converged interface the first data packet to the first target network address via the second network using the second network link and the second network interface.

* * * * *